(12) United States Patent
Yan et al.

(10) Patent No.: US 11,500,933 B2
(45) Date of Patent: Nov. 15, 2022

(54) TECHNIQUES TO GENERATE AND STORE GRAPH MODELS FROM STRUCTURED AND UNSTRUCTURED DATA IN A CLOUD-BASED GRAPH DATABASE SYSTEM

(71) Applicant: Capital One Services, LLC, McLean, VA (US)

(72) Inventors: Shuzhao Yan, Herndon, VA (US); Ashok Kari, Vienna, VA (US); Biying Tang, Arlington, VA (US); Serge Vilvovsky, Belmont, MA (US); Ada Cheung, Vienna, VA (US); Kaleen Love, Alexandria, VA (US); Nitin Sharma, Richmond, VA (US); William Schineller, Sudbury, MA (US); Marina Giliver, Marblehead, MA (US); Bangda Sun, Arlington, VA (US); Yuhang Zhan, McLean, VA (US); Elizabeth Miller, Lexington, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/089,418

(22) Filed: Nov. 4, 2020

(65) Prior Publication Data
US 2022/0138262 A1    May 5, 2022

(51) Int. Cl.
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 6,571,249 B1 * | 5/2003 | Garrecht | G06F 16/338 707/999.102 |
| 9,535,902 B1 | 1/2017 | Michalak et al. | |
| 2014/0280044 A1 * | 9/2014 | Huynh | G06F 16/24578 707/722 |
| 2014/0337373 A1 * | 11/2014 | Morsi | G06F 16/245 707/769 |
| 2015/0095303 A1 * | 4/2015 | Sonmez | G06N 5/003 707/707 |
| 2015/0331877 A1 | 11/2015 | Lou et al. | |
| 2016/0321357 A1 * | 11/2016 | Novacek | G06F 16/93 |

(Continued)

OTHER PUBLICATIONS

International Search Report and Written Opinion for the International Patent Application No. PCT/US2021/058080, dated Feb. 9, 2022, 15 pages.

*Primary Examiner* — Tony Mahmoudi
*Assistant Examiner* — Umar Mian
(74) *Attorney, Agent, or Firm* — KDB

(57) ABSTRACT

Embodiments include systems, methods, articles of manufacture, and computer-readable media configured process data in a structured format and an unstructured format and applying one or more algorithms to detect elements and links between the elements in the data. Embodiments are further configured to generate a graph model comprising nodes comprising the elements and edges comprising the links.

13 Claims, 11 Drawing Sheets

(56) References Cited

U.S. PATENT DOCUMENTS

| | | | |
|---|---|---|---|
| 2017/0330092 A1* | 11/2017 | Lindsley | G06N 5/022 |
| 2019/0278777 A1 | 9/2019 | Malik et al. | |
| 2019/0354544 A1 | 11/2019 | Hertz et al. | |
| 2020/0104401 A1* | 4/2020 | Burnett | G06F 16/287 |
| 2020/0226156 A1* | 7/2020 | Borra | G06F 16/9024 |
| 2020/0320130 A1* | 10/2020 | Korpman | G06F 16/90335 |
| 2021/0064609 A1* | 3/2021 | Riscutia | G06F 16/9024 |

\* cited by examiner

TECHNIQUES TO GENERATE AND STORE GRAPH MODELS FROM STRUCTURED AND UNSTRUCTURED DATA IN A CLOUD-BASED GRAPH DATABASE SYSTEM

BACKGROUND

Enterprise systems have typically been implemented on a localized system and store data in one or more rational databases. These databases include highly-structured tables that require developers and applications to strictly structure the data used in their applications. Moreover, the rigidity of such databases generally require operations that are compute-heavy and memory-intensive and have an exponential cost. Other database structures, such as NoSQL structures, have been utilized but are generally simple and have limited operations. Further, both relational and NoSQL structures miss the importance of connections between data, which is critical when trying to detect related issues that are not apparent at first glance.

Current trends include utilizing a graph model structure or a graph database to store data that is highly connected to provide flexibility in adding data, running faster relationship-based searches, and indexing by relationships. However, current graph databases often fail to create better relationships between data or elements because they rely on a user or administrator to provide a graph model to define the relationships. Embodiments discussed herein solve these problems.

BRIEF SUMMARY

Embodiments may be generally directed to techniques and systems, including a storage configured to store graph databases and one or more processors coupled with the storage. The systems may also include memory coupled with the storage and the one or more processors, the memory to store instructions, the instructions that when executed by the one or more processors, cause the one or more processors to obtain first data comprising a first set of elements in a structured format and first connection information, obtain second data comprising one or more text segments, the one or more text segments comprising potential elements, and apply a name entity recognition analysis to the second data to detect a second set of elements and second connection information, the second set of elements detected from the potential elements and the second connection information to indicate links between one or more of the second set of elements. The instructions may further cause the one or more processors to generate a graph model comprising nodes and edges from the first set of elements, and the second set elements, wherein each node comprises an element from the first set of elements or the second set of elements, and each edge to link one of the nodes to another one of the nodes based on the first connection information, the second connection information, or a combination thereof, and store the graph model in a graph database in the storage.

Embodiments also include A computer-implemented, comprising obtaining structured data comprising node information and connection information, the connection information to indicate links between a first set of elements of the node information, obtaining unstructured data comprising one or more text segments, the one or more text segments comprising potential elements, and applying a name entity recognition analysis to the unstructured data to detect a second set of elements and additional connection information, the second set of elements detected from the potential elements and the additional connection information to indicate links between one or more of the second set of elements. The method also includes generating a graph model comprising nodes and edges from the first set of elements, and the second set elements, wherein each node comprises an element from the first set of elements or the second set of elements, and each edge to link one of the nodes to another one of the nodes based on the connection information, the additional connection information, or a combination thereof, and storing the graph model in a graph database in a storage.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
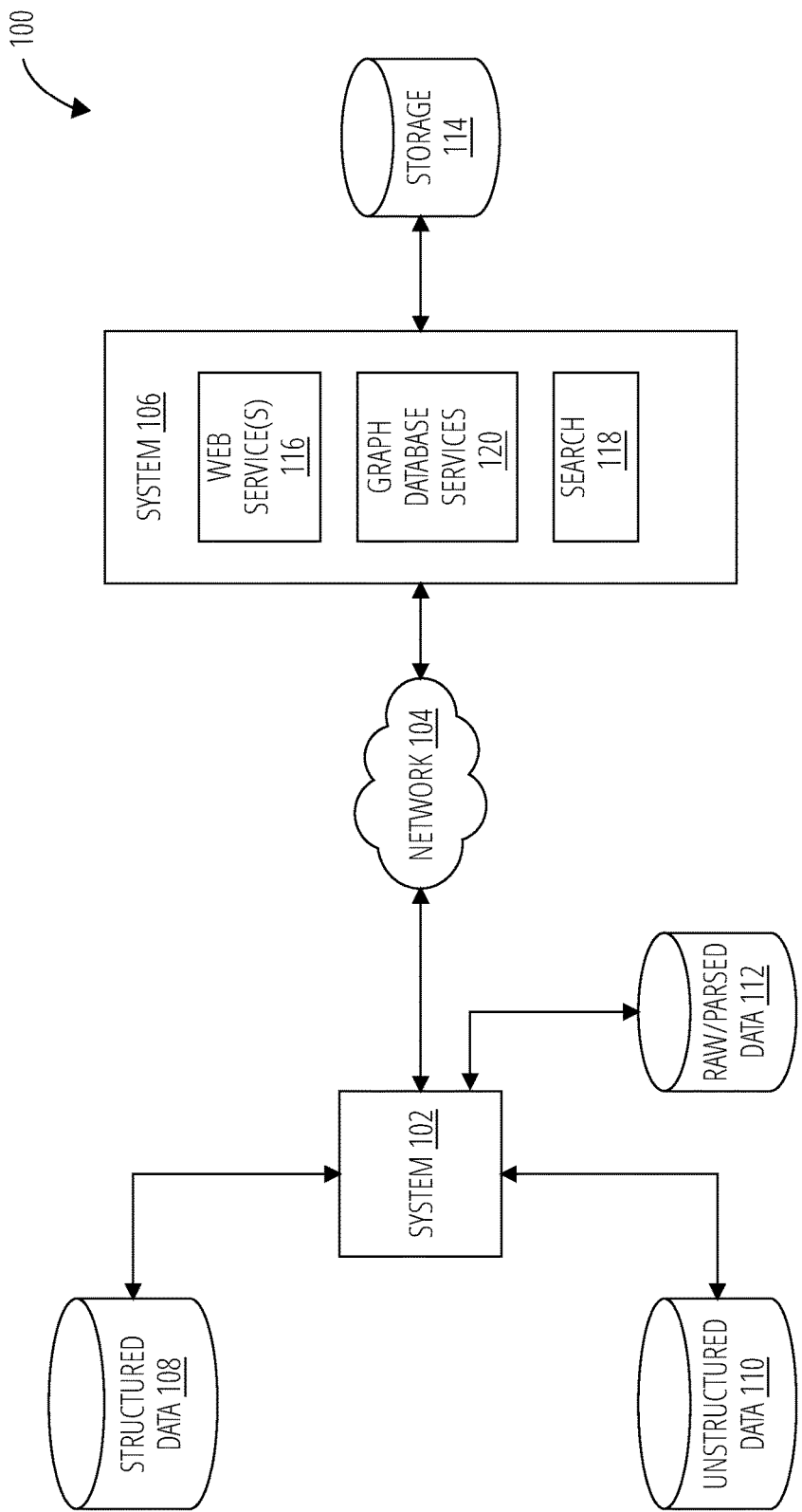
FIG. 1 illustrates an example of a system 100 in accordance with embodiments.

FIG. 1 illustrates an example of a system 100 that may operate in accordance with embodiments discussed herein. FIG. 1 illustrates system 100 in a simplistic manner and includes a number of components not illustrated in FIG. 1, including additional systems, computing devices, networking equipment, processors, memory, storage, interfaces, connecting mediums (wireless and/or wired), and so forth.

System 100 includes a system 102, which may be an enterprise system including a number of servers, computers, computing devices, processors, memory, storage, etc. to integrate a number of systems, applications, protocols, and formats. In one example, an enterprise system enables a business to process data to support particular functions or processes. The data processing may include analyzing data and providing the data in a format to enable users to make decisions. For example, the enterprise system may process data to support an audit department performing audit tasks and risk management.

Historically, an enterprise system stored data in one or more databases in highly-structured tables with predetermined columns of specific types and many rows of those defined types, e.g., a relational database format. Due to the rigidity of their organization, relational databases require developers and applications to strictly structure the data used in their applications. In relational databases, references to other rows and tables are indicated by referring to primary key attributes via foreign key columns. Joins are computed at query time by matching primary and foreign keys of all rows in the connected tables. These operations are compute-heavy and memory-intensive and have an exponential cost. When many-to-many relationships occur in the model, you must introduce a JOIN table (or associative entity table) that holds foreign keys of both the participating tables, further increasing operation costs. Those types of costly join operations are often addressed by denormalizing the data to reduce the number of joins necessary, therefore breaking the data integrity of a relational database. Other database structures have been used, such as the NoSQL structures, which are aggregate-oriented and group data based on a particular criterion. These models generally provide simple and limited operations. Both relational and NoSQL structures miss the importance of connections between data, which is critical when trying to detect related issues that are not apparent at first glance.

Current trends include utilizing a graph model structure or a graph database to store data that is highly connected to provide flexibility in adding data, running faster relationship-based searches, and indexing by relationships. However, current graph databases often fail to create better relationships between data or elements because they rely on a user or administrator to provide a graph model to define the relationships. Often relationships between data are missed or not apparent to the user because of the impossible task of looking through huge data sets. Embodiments discussed herein provide technical improvements to graph databases by applying one or more graph algorithms in a new and useful manner to more accurately detect relationships between data or entities. Thus, embodiments improve the accuracy of a graph model and enable a graph database to return more accurate results in response to queries. Another limitation of the current implementations of graph databases is their ability to scale. Current implementations generally require all the data to be stored on one server or a single and cannot be scaled beyond a certain point. However, embodiments discussed herein solve this scalability issue by implementing the graph database on a cloud-based system, such as system 106.

As mentioned, system 102 may include any number of servers and may include or be coupled with one or more storage systems, such as storage 108, storage 110, and storage 112. Storages 108, 110, and 112 may be any type of storage, such as a storage array, and include devices such as hard disk drives, solid-state drives, tape drives, or any other type of optical, magnetic, and/or semiconductor storage.

In embodiments, the storages 108, 110, and 112 may store any type of data, such as structured data and unstructured data. In the illustrated example, storage 108 stores structured data. The structured data may be any organized data that conforms to a certain format. For example, the structured data may be highly-organized and formatted in a way that is easily searchable in a relational database. Examples of structured data include numbers, dates, and groups of words and numbers called strings. For example, the structured data may include audit data, prime issue data, human resource data, and so forth.

In some instances, the structured data may be in already be in a graph model format configured automatically by system 102 or by a user of the system 102. However, the structured data in storage 108 may be a preliminary format prior to one or more operations or graph algorithms performed on the data to detect additional edges or relationships between the elements and the inclusion of the unstructured data.

In the illustrated example, storage 110 stores unstructured data. The unstructured data may be data that does not have a predefined data model or is not organized in a predefined manner. Unstructured data may be text-heavy, such as data found in books, journals, documents, metadata, health records, audio, video, analog data, images, files, laws, regulations, and organizations. Additional examples include text found in the body of an e-mail message, Web pages, or word-processor document. With respect to the audit example, the unstructured data may include objects or elements found in laws, regulations, organizations, product descriptions, and people that are related to the audit universe but are described in text descriptions.

In embodiments, the system 102 may include or be coupled with additional storage to store data while performing processing operations and the results of the processing operations. For example, storage 112 can be utilized to store raw data, e.g., structured and/or unstructured data, prior to performing one or more parsing and transformation operations on the data, as will be discussed in more detail below. The storage 112 may also store the results of processed data after one or more operations are performed on the raw data. The processed data may include parsed data and may be in a graph model format.

System 102 may also be coupled with other systems, devices, components, and so forth. In the illustrated example, the system 102 is coupled with system 106 via network 104. The network 104 may be any type of network and include wired and/or wireless connections. In some instances, the network 104 may include the Internet, and the system 106 may be a cloud-based computing system. In one example, system 106 may be an on-demand cloud computing platform and provide functionality for system 102 to perform operations, as discussed herein. For example, the system 106 provides cloud computing web services, including abstract technical infrastructure and distributed computing building blocks and tools. These services may be provided on a virtual cluster of computers, available all the time, and through the Internet. The cluster of computers may provide virtual computers to emulate the components of a real computer, including hardware central processing units (CPUs) and graphics processing units (GPUs), local/RAM memory, hard-disk/SSD storage, one or more operating environment, and pre-loaded application software such as web servers, and databases including graph databases. The system 106 may be implemented as server farms. In some instances, the system 106 may be a third-party system, such as Amazon® Web Services. The third-party system may offer services on a fee-based structure, including models, such as "Pay-as-you-go."

The system 106 may be configured and provide graph database services 120 and one or more graph databases, which may be stored in storage 114. In embodiments, a graph database may be a database that uses graph structures for semantic queries with nodes, edges, and properties to represent and store data. As previously discussed, the advantages of graph databases include the edges, which define relationships between nodes or elements. A graph model may relate data elements to a collection of nodes and edges, the edges representing the relationships between the nodes. The relationships allow data elements to be linked together directly and, in many cases, retrieved with one operation or query. In some instances, the graph databases hold relationships between data elements as a priority. Querying relationships is fast because they are perpetually stored in the database. Relationships can be intuitively visualized using graph databases, making them useful for heavily interconnected data, such as audit data.

In embodiments, the system 106 may be coupled with and/or include storage 114 to store the one or more graph databases. The system 106 may use an underlying storage mechanism to store the graph databases. In one example, the system 106 may store a graph database based on a relational engine and "store" the graph data in a table implemented level of abstraction between the graph database, the graph database management system, and the physical devices (storage 114) where the data is actually stored. In another example, the system 106 may utilize a key-value store or document-oriented database for storage.

In example embodiments, the system 106 may utilize Amazon® Neptune to implement the one or more graph database services 120. The graph database services 120 may utilize a fully managed graph database service, such as Neptune, to build and run applications that work with highly connected datasets, such as the audit data. In embodiments, the system 106 may implement the graph database services 120 and enable read replicas, point-in-time recovery, continuous backups, and replication. In addition, the system 106 may provide data security features, and support data encryption at rest and in transit. In a specific example, the system 106 may provide a primary database instance that supports read and write operations and performs all of the data modifications to a cluster volume. In some embodiments, the system 106 may deploy a number of database clusters, and each cluster may have a primary database instance that is responsible for writing (that is, loading or modifying) graph database contents. The system 106 may also connect a replication database to the same storage volume as the primary database instance and supports only read operations.

In embodiments, the system 106 also includes a query or search functionality 118 to enable users to query the graph database(s). The system 106 enables users to create interactive graph applications that can query billions of relationships in milliseconds. The search functionality 118 may include open graph application program interfaces (APIs) such as Gremlin® and SPARQL®. SQL queries for highly connected data are complex and hard to tune for performance. The system 106 enables users to build queries that efficiently navigate highly connected datasets.

In some embodiments, the system 106, including the search functionality 118, provides a distributed, multitenant-capable full-text search engine with a Hypertext Transfer Protocol (HTTP) web interface and schema-free JavaScript® Object Notation (JSON) documents, such as Elasticsearch®. The search functionality 118 may include scalable searching, near real-time searching, and supports multitenancy. In some embodiments, the search functionality 118 may be distributed and include indices divided into shards, and each shard can have zero or more replicas. The system 106 may be configured such that each instance or node hosts one or more shards and acts as a coordinator to delegate operations to the correct shard(s). The search functionality 118 may provide automatic rebalancing and routing. In some configurations, system 106 may store related data in the same index, which consists of one or more primary shards and zero or more replica shards.

In embodiments, the search functionality 118 is provided through the JSON and Java API(s), which may be accessed by system 102. Utilizing a distributed, multitenant-capable full-text search engine, such as Elasticsearch®, in an Audit universe enables users to uncover risk pervasiveness by identifying risk pervasiveness into multiple lines of business based on the relationships defined by the edges and the search functionality's 118 ability to traverse the graph database(s) and extrapolate the connections, as will be discussed in more detail below.

In embodiments, the search functionality 118 may be full-text integrated into the graph database services 120 utilizing clusters. This may enable users of system 102 to use the search indexing capabilities within the clusters with the graph model or data stored in the graph database(s) to quickly query results. For example, Elasticsearch's built-in text indexing and query capabilities enable customers to run full-text search query types such as match query, intervals query, and query strings. For example, a user may utilize a graph traversal language, such as Gremlin®, using the wideSideEffect step and pass the Elasticsearch endpoint, search pattern, and field information to perform a query. However, embodiments are not limited in this manner, and different traversal languages may be utilized to perform queries.

In embodiments, the system 106 may receive a query from the system 102, perform a search utilizing the search functionality 118, and generate a result. The result may include elements related to the query. For example, the search functionality 118 may determine nodes and edges of the graph model associated with the query. The nodes may include elements and may be determined by the relationship identified by connecting edges. The system 106 may feed the results, via a graph traversal language function of search functionality 118, into a web service application(s) 116 to enable a user to visualize the results. The system 106 includes one or more web service application(s) 116, including a graph and data visualization application, such as Tom Sawyer®. The graph and data visualization application may organize the results, including the nodes and edges, such that the user may understand relationships, trends, and patterns. The visualization application includes an API library-based Software Development Kit (SDK) and graphics-based design software (IDE). In some embodiments, the library includes a visualization API, a layout API, and an analysis API, which may be used by a user and system 102 to process the results of a query and present the results in a meaningful way.

Figure 2:
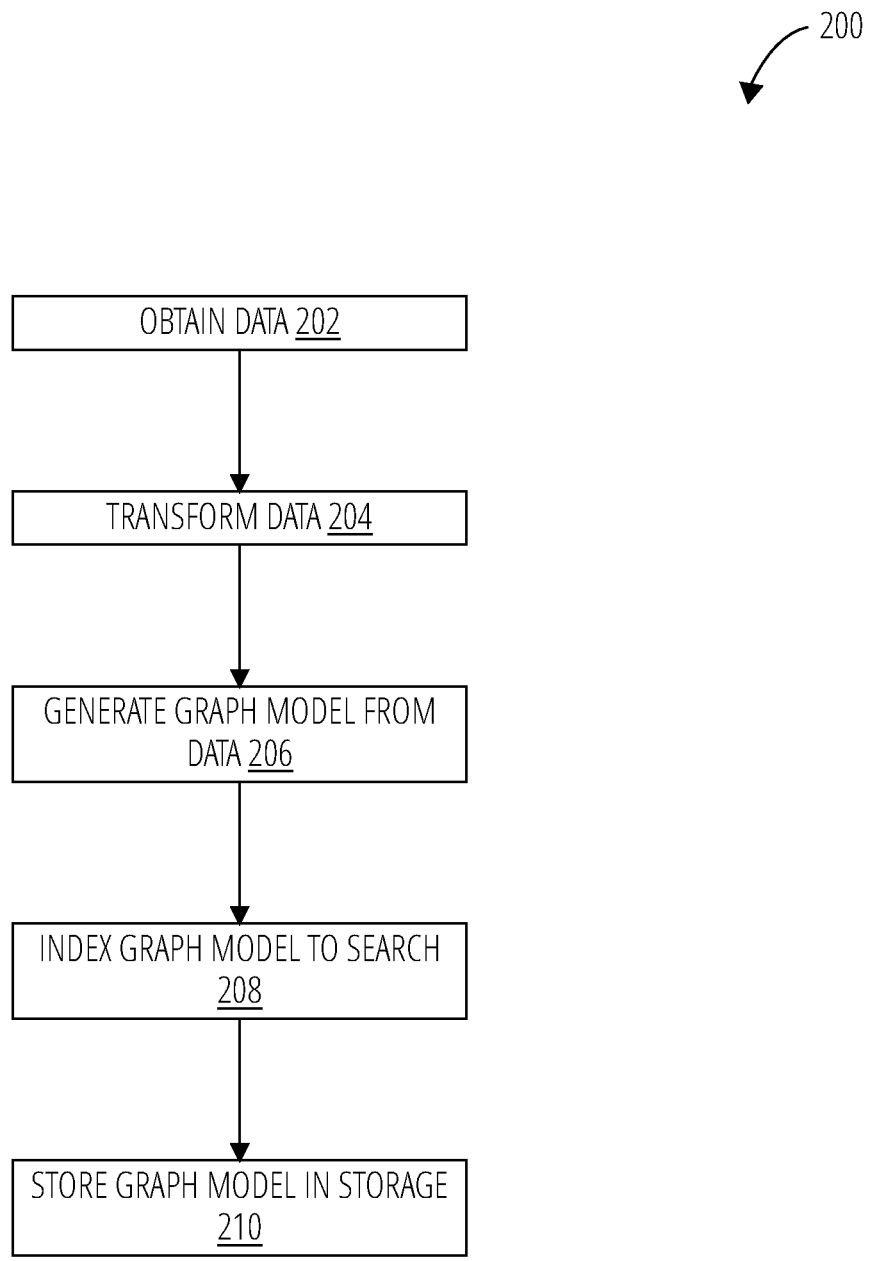
FIG. 2 illustrates a processing flow 200 in accordance with embodiments discussed herein.

FIG. 2 illustrates an example processing flow 200 that may be performed by system 100. Specifically, the operations of processing flow 200 may be performed by system 102 and system 106 to apply graph algorithm to on datasets, generate graph models, and store graph models in a graph database(s).

At block 202, the processing flow 200 includes obtaining data. In embodiments, the data may be stored in one or more storage systems, such as storage 108 and storage 110 or data warehouses and include structured data and unstructured data. The structured data may include data in any organized format. For example, structured data may be data organized in a comma-separated values (CSV) format in a delimited text file and each line in the file is a data record. In another example, the structured data may be in a JavaScript Object Notation (JSON) format, including attribute-value pairs and array data types. In a third example, the structured data may be organized as text parsed with regular expressions. Embodiments are not limited in this manner. In some instances, at least a portion of the structured data may be configured in accordance with a graph model.

In embodiments, the obtained data may include unstructured data that may include one or more text segments. The unstructured data does not have a predefined data model or is not organized in a predefined manner. As mentioned, the unstructured data may include objects or elements found in the text of laws, regulations, organizations, product descriptions, and people that are related to the audit universe but are described in text descriptions. In embodiments, the unstructured data may be obtained from a storage location, such as storage 110. However, embodiments are not limited in this manner. In some instances, the unstructured data may be obtained from websites, computer documents, books, journals, documents, metadata, records, audio data, video data, analog data, images, files, and e-mail messages. For example, the system 102 may perform a scrape or crawl of websites associated with laws and regulations to collect text data. The same method may be applied to other sources, such as company documents, recordings of help/complaint chats, internal and external e-mails and so forth.

In embodiments, the data may include one or more different data types. In one example, the different types of elements may include issues (banking, customer service, legal, compliance, etc.), validation items, account executives (or line of business) and audit entities, such as Matter(s) Requiring Attention (MRAs), online news sources, customer call transcripts, controls, and risks. The issues may be problems or potential problems that may affect other elements, such as an account executive(s), line of business(es) or another entity(ies). The validation items may be rules, regulations, laws, and/or other standards that may apply to the other elements. Examples of validation items may include the Uniform Retail Credit Classification and Account Management (URCCAM), Right To Financial Privacy Act (RFPA), Regulation O—Loans to Executive Officers, Directors, and Principal Shareholders of Member Banks, Interagency Guidance on Credit Card Lending—Account Management and Loss Allowance, Fair Credit Reporting Act (FCRA), US—FTC—Guide Concerning Use of the Word Free and Similar Representations, Interagency Guidance on Authentication in an Internet Banking Environment, Regulation B—Equal Credit Opportunity Act, Consumer Financial Protection Bureau (CFPB)—Phone Pay Fees, Operating Rules of the National Automated Clearing House Association (NACHA), Controlling the Assault of Non-Solicited Pornography And Marketing Act (CAN-SPAM), and Unfair or Deceptive Acts or Practices (UDAP). The account executives may be the leads of specific lines of business. The audit entities may be external business partners.

Figure 3:
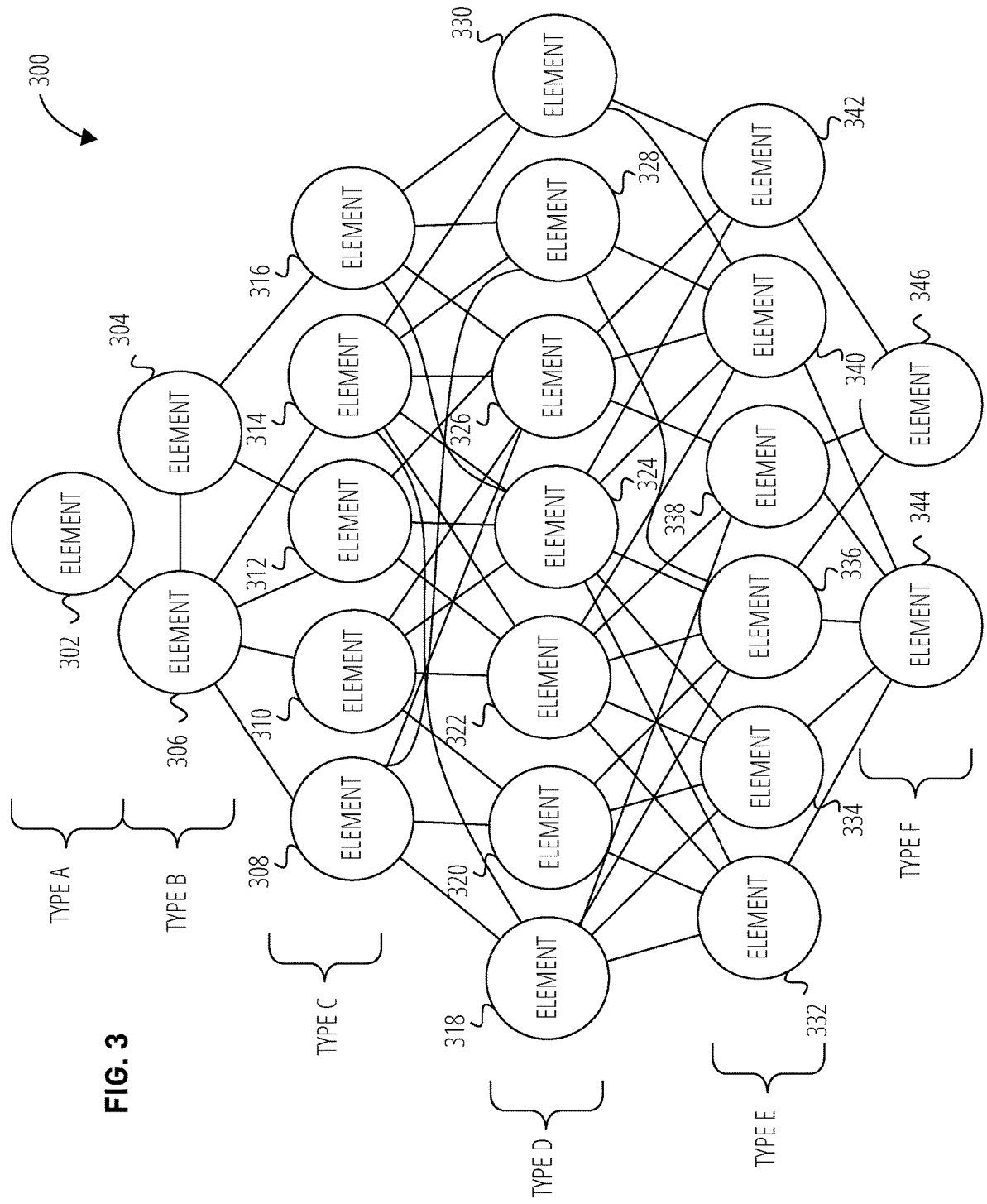
FIG. 3 illustrates a graph model 300 in accordance with embodiments.

At block 204, the processing flow 200 may include performing one or more operations or transformations on the data and apply graph algorithms on the datasets. The obtained data may be in a raw data format and may be parsed and transformed by the system 102 into proper nodes and edges for ingestion by the system 106, for example. With respect to the structured data, the system 102 may generate nodes with the data based on the different data types and connection information. Each node may include an element of a specific piece of data and include an identifier or name. In embodiments, the nodes may also be grouped based on the data types. Data of the same data type may be grouped together based on a data group identifier. Thus, when presented to a user, the elements of the same data type may be presented together or at the same level, as illustrated in FIG. 3.

In embodiments, the connection information for the structured data may include one or more rules that may be utilized by the system 102 to define relationships between nodes and generate edges. For example, one or more rules may link or define edges between different data types, such as relationships between business issues and different lines of business. In another example, the rules may include user-defined relationships, e.g., a user may utilize an input device to define links between nodes. In embodiments, the relationships between the nodes may also be based on probabilities and similarity analysis, as discussed below. For example, the system 102 may apply probabilistic models to data to determine whether a relationship exists between the nodes. The probabilistic models may be trained utilize historical data including defined relationships between nodes.

The system may also process and transform unstructured data. For example, the system 102 may apply a graph model including one or more text or character recognition techniques to determine entities for nodes and connection information to link nodes. In one specific example, the system 102 may determine entities for the nodes by applying a named entity recognition (NER) technique to the text segments of the unstructured to identify named entities. The NER analysis is a task of information extraction operation that locates and classifies named entities into predefined categories, such as law, organization, product name, etc. The system 102 may also determine connection information for the unstructured data based on the same entities within different segments or documents. For example, the system 102 may create a link between different text segments and entities within the text segments based on having at least one common named entity, as will be discussed in more detail in FIG. 4 and FIG. 5.

The system 102 may also determine connection information for the structured data and unstructured by applying a text similarity analysis. In one example, the system 102 may apply a cosine similarity analysis to each of the structured data and/or unstructured data to measure the similarity in the text to determine connection information and elements of nodes. The one or more edges may be determined for the nodes based on a similarity score above a similarity threshold as a result of the text-similarity analysis. The similarity threshold may be set by an administrator or automatically by system 102 based on a selected number of nodes and/or connections for a given graph database. With respect to the audit example, the system 102 may record or document issues over a period of time, e.g., a number of years. Some of these issues, may be raised in different lines of businesses, share common themes or involve the same business processes. The system 102 may utilize the text embeddings (sentence embeddings, document embeddings) and cosine similarity to calculate similarities between pairs of issues, and connect these issues in the graph database. The system 102 may also determine similarities between other text-rich nodes, such as issues audit entity descriptions controls, processes, news, regulations, etc. One advantage of applying these techniques is providing better connectivity and allowing graph queries to extract themes and emerging issues that are otherwise hard to detect.

Embodiments are not limited to utilizing a cosine similarity analysis to determine text similarities in the data. Other examples may include machine-learning techniques including structured learning, by training a model with a data set or unstructured learning. Other algorithms may include, but are not limited to, Jaccard Similarity, Different embeddings+K-means, Different embeddings+Cosine Similarity, Word2Vec+Smooth Inverse Frequency+Cosine Similarity, Different embeddings+LSI+Cosine Similarity, Different embeddings+LDA+Jensen-Shannon distance, Different embeddings+Word Mover Distance, Different embeddings+

Variational Auto Encoder (VAE), Different embeddings+ Universal sentence encoder, Different embeddings+Siamese Manhattan LSTM, BERT embeddings+Cosine Similarity, Knowledge-based Measures.

In embodiments, at block 206 processing flow 200 may include running a graph algorithm and generating a graph model. The graph model may be generated based on the identified elements and connection information determined from one or more of the analyses performed. For example, the system 102 may generate one or more nodes and edges file(s) to ingest into system 106 to store as a graph database.

The system 102 may also generate one or more JSON files to ingest for the search functionality 118. As previously discussed, the data may be transformed into structured data and the system 102 may utilize an Amazon service, such as Amazon's ElasticSearch service, Kinesis Data Firehose, Logstash, or Cloudwatch Logs, to ingest the data into the search cluster and index the graph database at block 208. The system 102 may enable users to utilize an existing Elasticsearch cluster or create a new one to use with full-text search queries. The unified JSON document structure may store both SPARQL and Gremlin data in Elasticsearch. The search functionality 118 enables users to run full-text search query types such as match query, intervals query, and query strings using extensions to Gremlin and SPARQL queries.

At block 210, the processing flow 200 includes storing the storage 114. In one example, the files may be copied from the system 102 to a storage service, such as an Amazon® S3 bucket. An AWS Identity and Access Management (IAM) role may be generated with permissions to make AWS service requests. An Amazon® S3 endpoint may be created to couple with the graph database. A load operation may be performed by sending a request via HTTP call to a graph database instance and the graph database instance assumes the IAM role to load the data from the bucket to the graph database. Embodiments are not limited in this manner, and other ingestion techniques may be utilized. In addition, the JSON files may also be ingested to the ElasticSearch.

FIG. 3 illustrates an example of a graph model 300 configuration. In the illustrated example, graph model 300 may include a number of nodes 302-346 connected via edges illustrating relationships between the nodes. The nodes 302-346, may include elements or text that may convey information to a user of the system. In embodiments, the nodes 302-346 may include different data types presented together. In this example, the elements having the same data type may be presented in the same row, such as indicated by the labels Type A, Type B, Type C, Type D, Type E, and Type F. However, embodiments are not limited in this manner and different visual presentations may be utilized, e.g., the data of the same data type in the same columns.

FIG. 3 illustrates one possible result that may be presented to a user of the system 106 in response to a query. As previously discussed, system 106 may process queries from users and perform searches utilizing the search functionality 118 to generate results. The results may include elements related to the query and connections between the elements. For example, results from the search functionality 118 may be provided to a web service application(s) 116 to enable a user to visualize the results. The web service application(s) 116 may be a graph and data visualization application, such as Tom Sawyer®, and/or built utilizing an application, such as React, Vue, or Angular. The graph and data visualization application may organize the results including the nodes and edges, such that the user may understand relationships, trends, and patterns.

Initially, the system 100 including the web service application(s) 116 may present all of the results including all of the entities in a GUI. The web service application(s) 116 may enable users to manipulate the data, focus on specific information, narrow down results to more applicable results, and so forth. These operations may be performed via one or more user inputs and displayed in a graphical user interface (GUI). In some instances, the web service application(s) 116 enables the end-users to tailor the results presented to them such that they can see the relationships between the nodes of different data types. For example, a user may be able to focus on a particular data type or set a threshold for a number of data elements in common with another element. The user may utilize a user input, such as a slider bar, to set a number of common entities to a specific entity or data type that must exist for entities to be presented. For example, if a user sets the common elements threshold to ten for a given element or elements of a particular data type. Only elements including entities having ten or more entities in common with the other entit(ies) will be presented. With respect to the audit example, a user may only want to audit entities having ten or more validation items in common and relating to business issues. A user may utilize the results to determine an owner, such as an account executive or line of business relating to the validation items and issues that may possibly affect the line of business.

Figure 4:
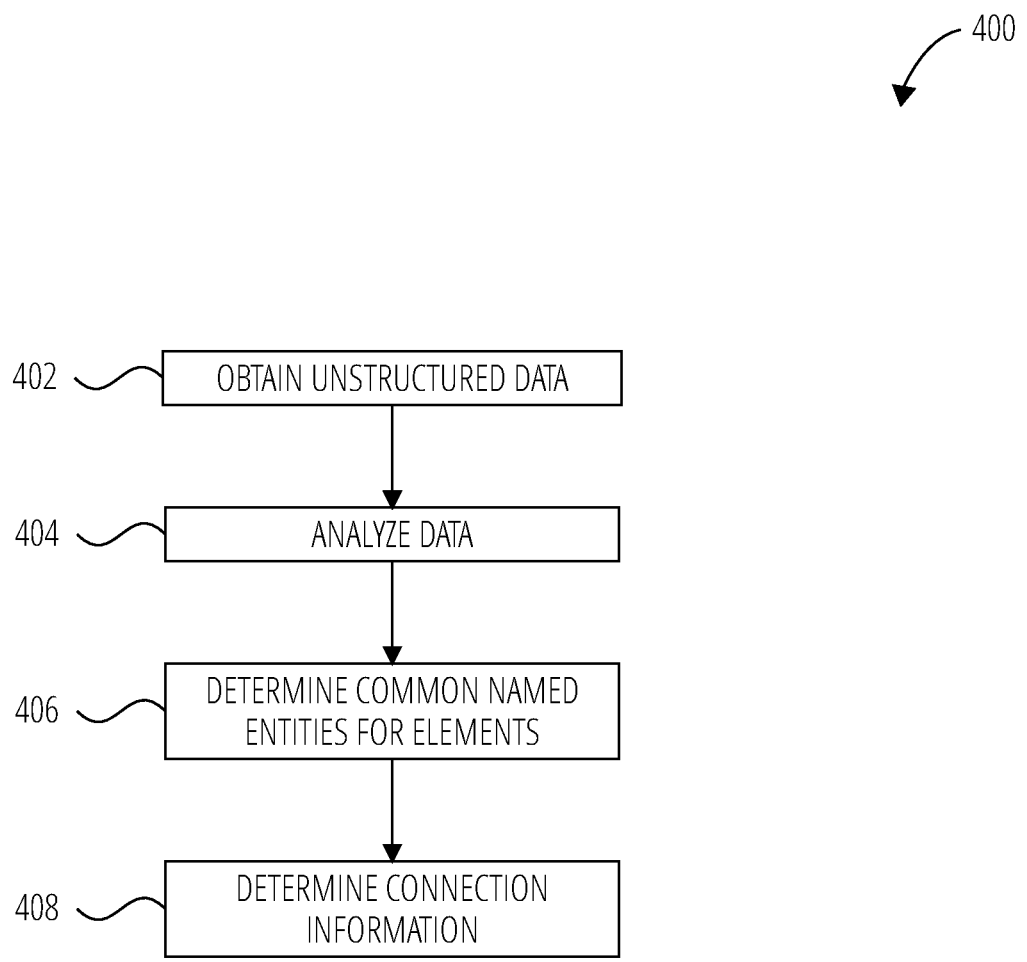
FIG. 4 illustrates a processing flow 400 in accordance with embodiments.

FIG. 4 illustrates an example processing flow 400 that may be performed by the systems discussed herein to process unstructured data to determine entities and connection information. The illustrated processing flow 400 may be performed by the system 102 and includes applying a named entity recognition technique.

At block 402, the processing flow 400 includes obtaining the unstructured data. For example, the system 102 may retrieve the data from a storage 110. The unstructured data may be collected on an ongoing basis and include data from computer documents, electronic mail (e-mail), chat conversations, and so forth. In other instances, the unstructured data may be obtained from other sources, such as websites, as previously discussed. For example, the system 102 may periodically scrape and collect data from different websites that relate to rules and regulations.

At block 404, the processing flow 400 includes analyzing the data. For example, the system 102 processes the unstructured data. Processing the data may include collecting the data at a central location, such as storage 110, and putting the data into a format such that the extraction operation may be performed. At block 406, the processing flow 400 includes determining common named entities for elements. For example, a NER operation may locate and classify each named entity in each piece of unstructured data into predefined categories, such as law, organization, product name, etc. The NER operation may be performed on all of the unstructured data collected and stored in storage 110.

Figure 5:
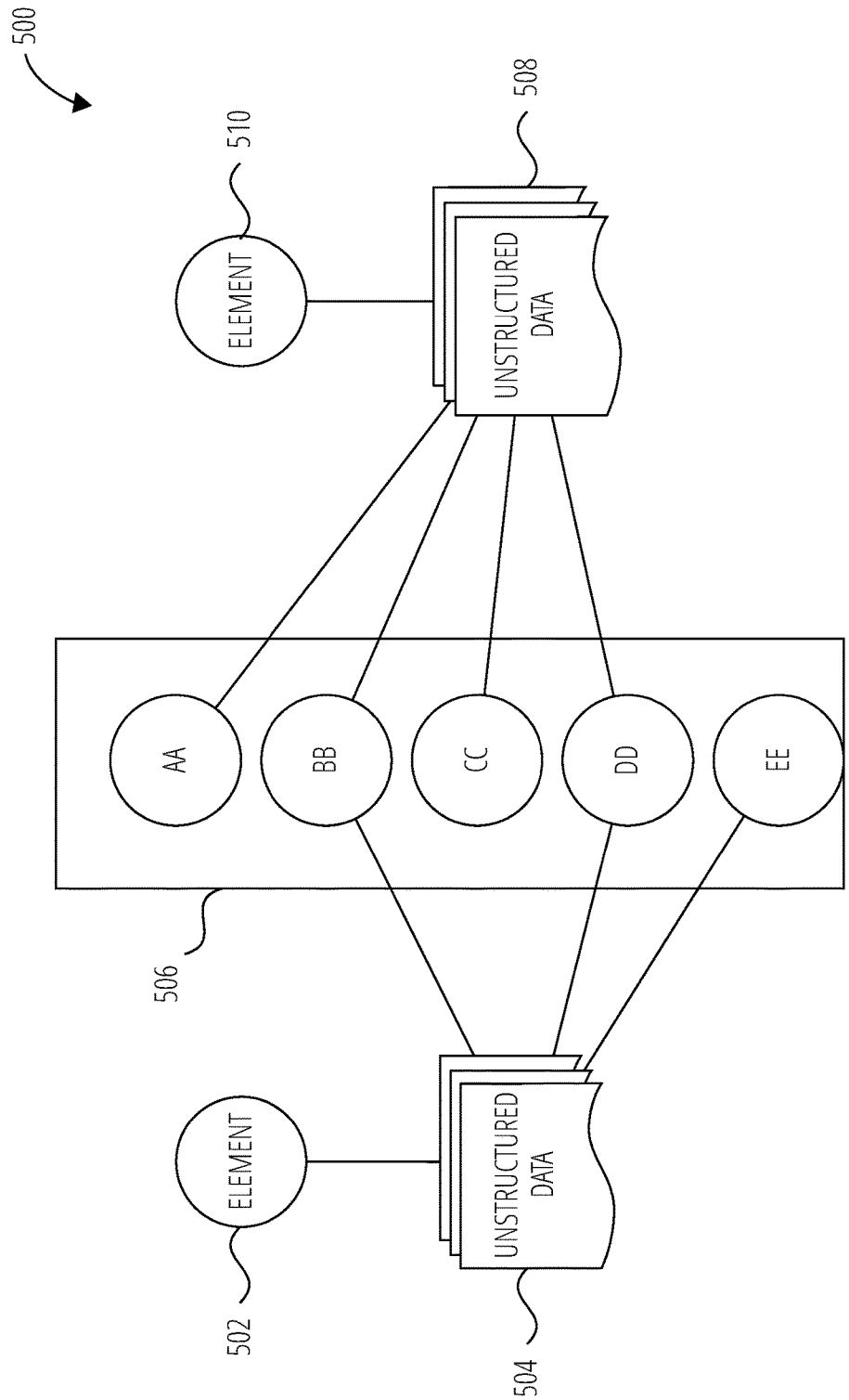
FIG. 5 illustrates a diagram 500 in accordance with embodiments.

At block 408, the processing flow 400 includes determining connection information for each of the named entities discovered. The connection information may link entities within common unstructured data. For example, the system 102 may link entities or generate connection information for entities from different data sources, e.g., documents, e-mails, websites, etc. when they have common named entities, as illustrated in FIG. 5. The connection information may be determined based on entities having a number of common NERs above a threshold value, as will be discussed in the example of FIG. 5.

FIG. 5 illustrates an example data diagram 500 based on a result of a NER operation performed on unstructured data.

The illustrated example only includes unstructured data relating to two different elements, element 502 and element 510; however, embodiments are not limited in this manner. In embodiments, the NER operations may be performed to detect any number of entities within unstructured data. As previously discussed and with respect to the audit example, there are certain elements in as laws, regulations, organizations and people that are tied to the audit universe but are only described in text-based descriptions in unstructured data. The NER operation can detect and retrieve the elements that are mentioned in the text and then model them into the audit universe automatically. These entities provide fine-grained information in audit.

In the illustrated example of FIG. 5, element 502 may be an issue and be associated with unstructured data, e.g., an issue described in an e-mail or documents. Element 510 may be another issue and may be associated with different unstructured data 508. The system 102 may perform the NER operation on the unstructured data 504 and unstructured data 508 to identify common entities. In FIG. 5, the list of named entities 506 includes all of the named entities found in both sets of the unstructured data 504 and unstructured data 508. The NER operation may further identify named entities that are common from each of the unstructured data 504 and unstructured data 508. In the illustrated example, both data sets include BB and DD. The NER operation may determine whether the number of common entities equals (or exceeds) a threshold value. For example, a threshold value may be set to two, and in this case, the NER operation may determine that the threshold value is met. Based on the threshold value being met, a link or connection may be generated between element 502 and element 510. However, if the threshold value is not met, a link will not be generated. Note that different logic may be utilized, and embodiments are not limited in this manner. Further, the threshold may be user configured or adjusted by system 102.

Figure 6:
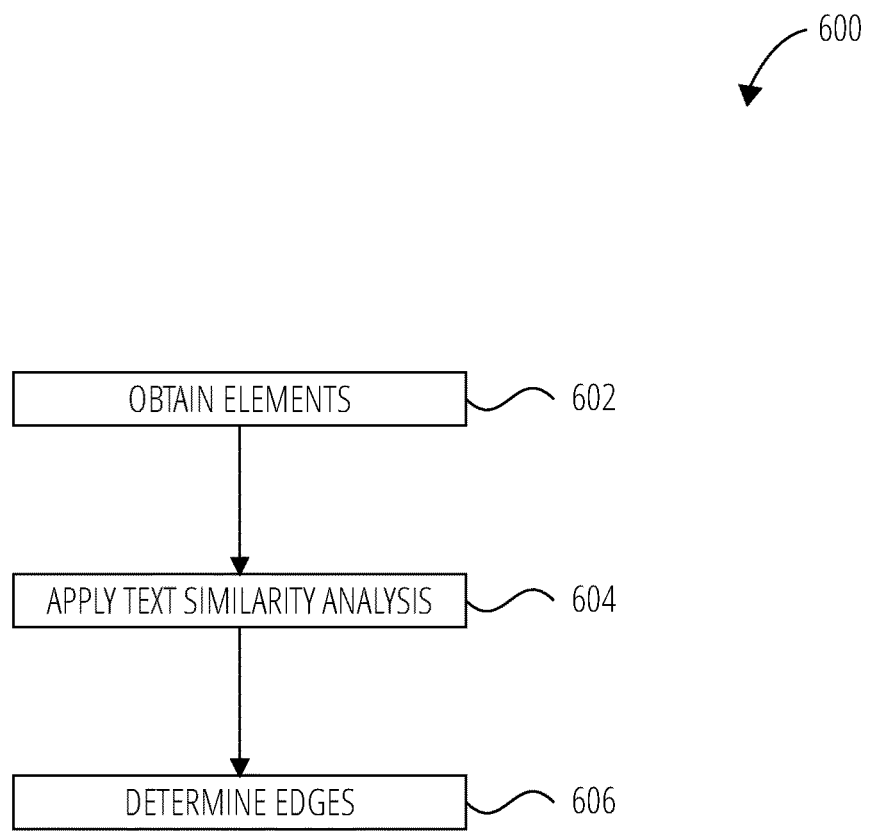
FIG. 6 illustrates a processing flow 600 in accordance with embodiments.
Figure 7:
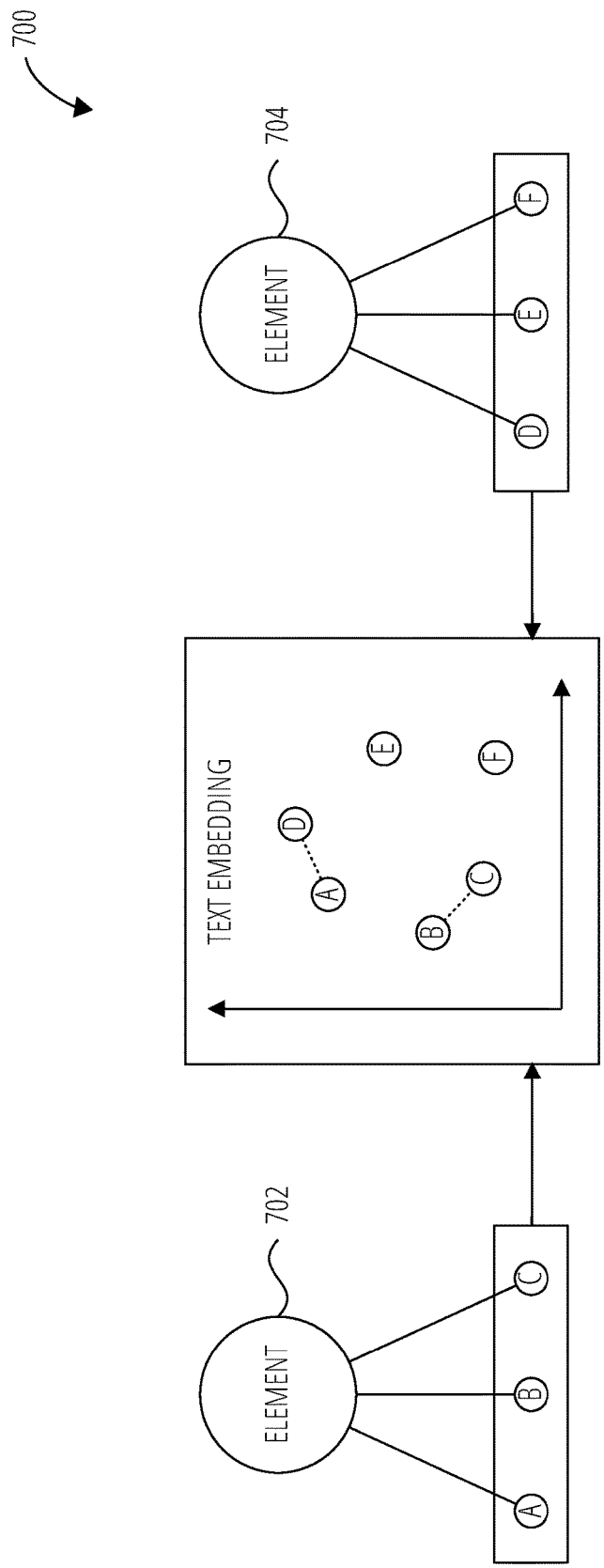
FIG. 7 illustrates a diagram 700 in accordance with embodiments.

The system 102 may run a NER operation on the unstructured data and detect all of the named entities within the data. The system 102 may further generate connection information for the unstructured data, including determining links between elements based on having common named entities. The elements and connection information may be further processed with the structured data to generate a graph model for storage in a graph database configuration. FIGS. 6 and 7 discuss additional operations that may be performed to detect additional connection information between entities.

FIG. 6 illustrates an example processing flow 600 that may be performed to generate additional connection information to define edges between nodes and entities based on text similarities. In some instances, data may include a number of entities, that are although are different, they are related in some manner. For example, an audit may include data that identifies a number of issues. Some of these issues may be raised in different lines of business but share common themes or involve the same business processes. Embodiments may include applying text similarity operations on the data to identify connections. For example, system 102 may apply embeddings (sentence embeddings, document embeddings) and a similarity algorithm to calculate similarities between pairs of issues and connect these issues in the graph database. These techniques provide better connectivity and allow graph queries to extract themes and emerging issues that are otherwise hard to detect.

At block 602, the processing flow 600 includes obtaining data including elements. The data may be collected from one or more of the structured data, and unstructured data, or a combination thereof. At block 604, the processing flow 600 includes applying a text similarity analysis to the data. In one example, the system 102 may apply a cosine similarity analysis to each of the structured data and/or unstructured data to measure the similarity in the text to determine connection information and elements of nodes at block 606. The one or more edges may be determined for the nodes based on a similarity score above a similarity threshold as a result of the text-similarity analysis. Embodiments are not limited to utilizing a cosine similarity analysis to determine text similarities in the data. Other examples may include machine-learning techniques including structured learning by training a model with a data set or unstructured learning. Other algorithms may include, but are not limited to, Jaccard Similarity, Different embeddings+K-means, Different embeddings+Cosine Similarity, Word2Vec+Smooth Inverse Frequency+Cosine Similarity, Different embeddings+LSI+ Cosine Similarity, Different embeddings+LDA+Jensen-Shannon distance, Different embeddings+Word Mover Distance, Different embeddings+Variational Auto Encoder (VAE), Different embeddings+Universal sentence encoder, Different embeddings+Siamese Manhattan LSTM, BERT embeddings+Cosine Similarity, Knowledge-based Measures.

FIG. 7 illustrates an example similarity analysis diagram 700 that includes the results of a similarity analysis performed. In the illustrated similarity analysis diagram 700, only a limited number of elements and connections are illustrated for explanation purposes and embodiments include applying a similarity analysis on any number of elements.

In FIG. 7, element 702 may be connected with additional elements A, B, and C, and element 704 may be connected with additional elements D, E, and F. In one example, 702 may represent a first line of business and elements A, B, and C may be different issues that are affected the line of business. Element 704 represents a second line of business and elements D, E, and F may be different issues that are affected the second line of business.

The system 102 may perform the similarity analysis and indicate how similar (or not similar) elements are to each other. For example, applying a cosine similarity analysis measures the similarity between two vectors of an inner product space. It is measured by the cosine of the angle between two vectors and determines whether two vectors are pointing in roughly the same direction and is used to measure document similarity in text analysis, such as text from different elements.

A document can be represented by thousands of attributes, each recording the frequency of a particular word (such as a keyword) or phrase in the document. Thus, each document is an object represented by what is called a document embedding vector. In embodiments, the cosine similarity may determine the words that are in the elements that are in common, and the occurrence frequency of such words. The analysis may indicate when text embeddings from two different elements include a cosine of the angle between the two vectors associated is above a threshold value. In the illustrated example, the distance between elements and A and D and (B and C), as indicated by the dashed line, may be above the threshold value and a connection between A and D and (B and C) may be made. Embodiments are not limited to applying the cosine similarity algorithm and other algorithms may be used, as previously discussed. Once all of the nodes including the elements and connections are determined the graph database may be generated. Users then may query the graph database to determine relationships between elements, as will be discussed in more detail in FIGS. 8 and 9A/9B.

Figure 8:
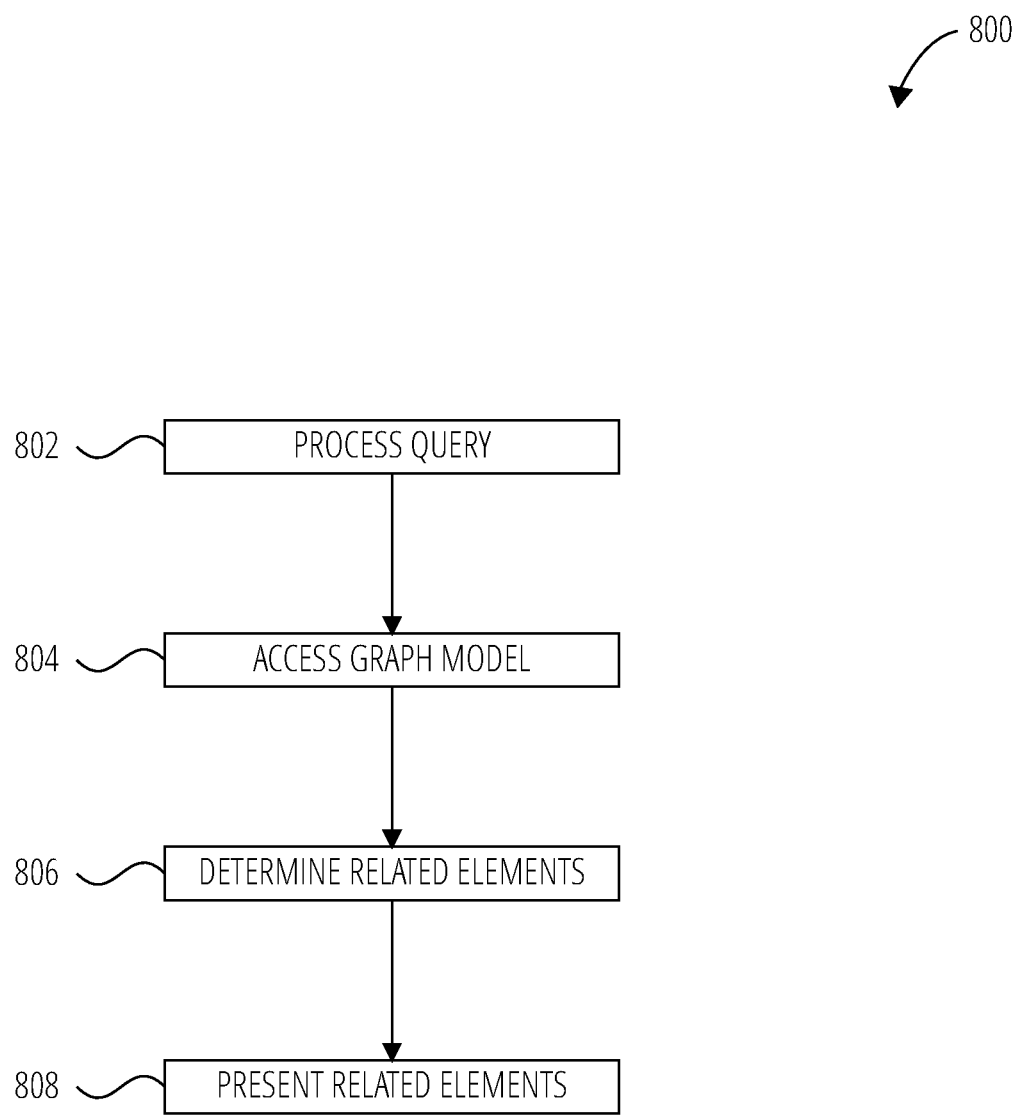
FIG. 8 illustrates a processing flow 800 in accordance with embodiments.

FIG. 8 illustrates an example of a processing flow 800 that may be performed by a system discussed herein to process the query of a graph database. For example, the system 106 may receive a query from a user and return a result of the query.

At block 802, the processing flow 800 includes receiving and processing a query for information in a graph database. The query may indicate an element of a node. For example, a user may submit a search for a particular issue to determine other elements related to the issue, e.g., different lines of businesses, audit entities that might be impacted by the selected issue, etc.

At block 804, the processing flow 800 including accessing the graph model and information stored in the graph database. Further and at block 806, the processing flow 800 may determine related elements. In some instances, the system 106 may determine all elements having at least one connection or relationship with the query. In this example, the system 106 may return every element that is connected to the query by one connection as a result to the query. In another example, a user may set a threshold value indicating a number of connections/relationships required. For example, a user may set the threshold value to three and only elements having three or more connections (direct or indirect) with the element of the query. A direct connection may be one connected directly with the query and indirect connections may be through another element.

In some instances, a user may query the system to return results having a number of connections above a threshold value for a particular data type. For example, a user may submit a query to show issues and only want the results to include elements having more than three or more impacted audit entities. Thus, the user may focus and determine issues that have high level of risk pervasiveness. Once the results are determined, the processing flow 800 includes presenting the related elements at block 808, e.g., in a web service application(s) 116 such as a data visualization application.

Figure 9:
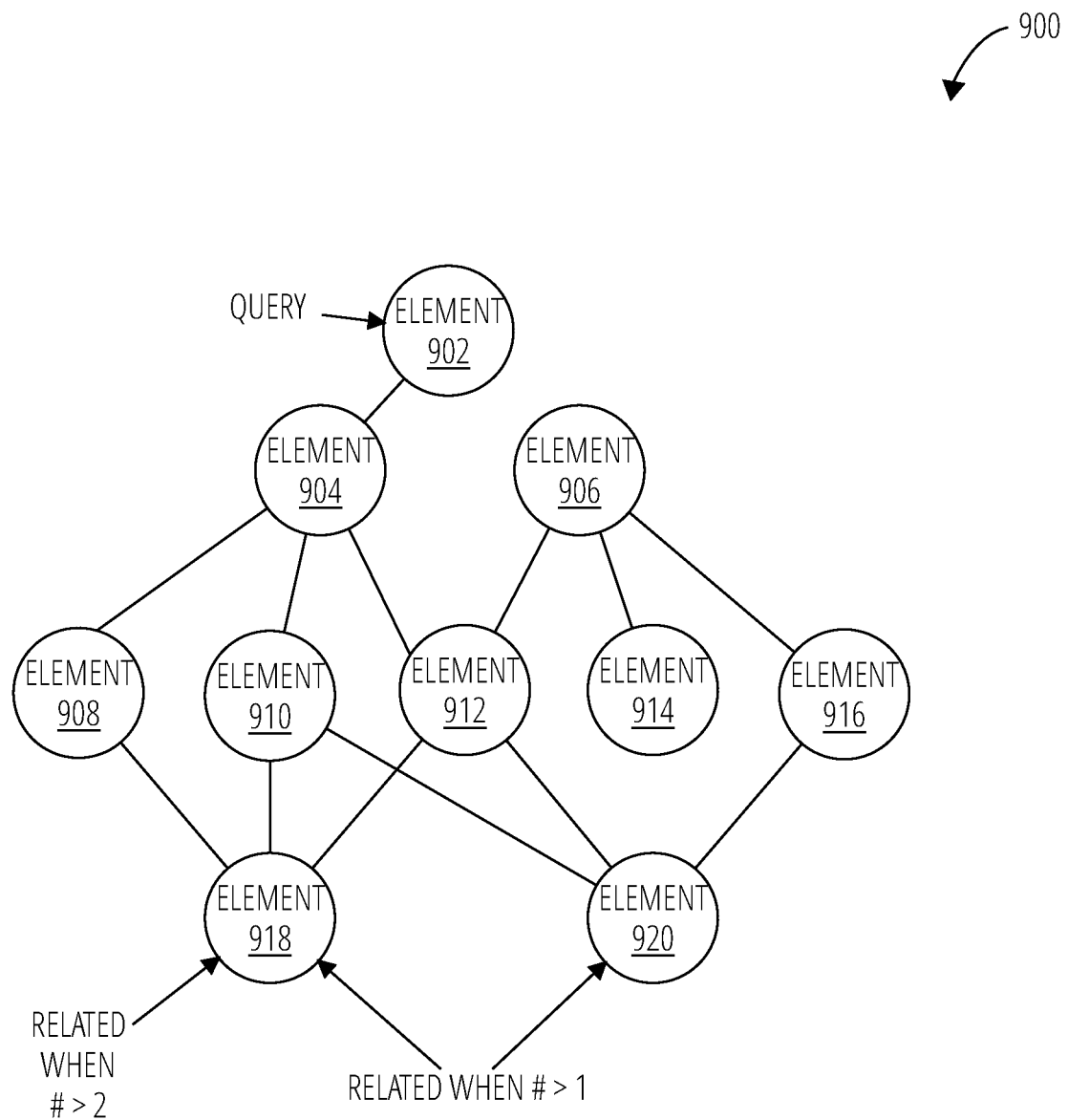
FIG. 9 illustrates a graph model 900 in accordance with embodiments.

FIG. 9 illustrates an example of results 900 that may be returned in response to a query submitted by a user. In this illustrated example, a user may submit a query as indicated by element 902. The system 106 may receive the query and determine elements that are related to element 902 by at least one connection either directly or indirectly.

As discussed above in FIG. 8, in some instances a user may desire to focus on elements of a particular data type related to the query element 902. For example, elements 918, and 920 may represent different lines of business or different leaders. In one example, a user may only want to see and/or include in the elements of the result of the particular data type (lines of businesses or leadership) that has more than two connections. In this example, only element 918 may be returned to the user since element 920 does not have more than two connections with element 902, either directly or indirectly.

However, in another example, a user may want to see results with elements of the particular data type having more than one connection. In this example, the system 106 may present both elements 918 and 920 since they both have at least two connections with the query element. Embodiments are not limited to the illustrated example, and different results may be generated and returned based on any number of user and/or system settings.

Figure 10:
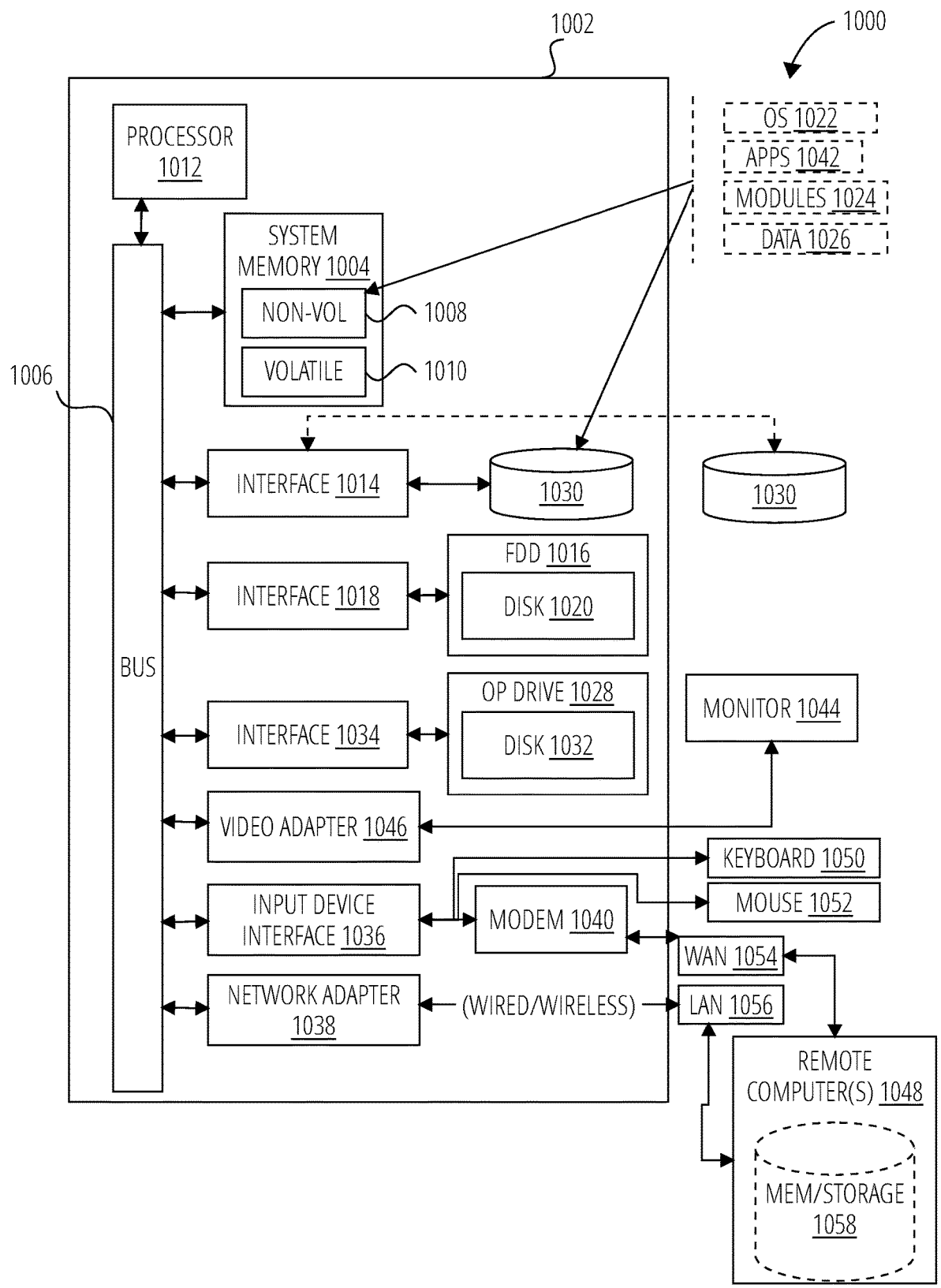
FIG. 10 illustrates a computer architecture 1000 in accordance with embodiments.

FIG. 10 illustrates an embodiment of an exemplary computer architecture 1000 suitable for implementing various embodiments as previously described. In one embodiment, the computer architecture 1000 may include or be implemented as part of systems 102 and 106.

As used in this application, the terms "system" and "component" are intended to refer to a computer-related entity, either hardware, a combination of hardware and software, software, or software in execution, examples of which are provided by the exemplary computing computer architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 10, the computing architecture 100 includes a processor 1012, a system memory 1004 and a system bus 1006. The processor 1012 can be any of various commercially available processors.

The system bus 1006 provides an interface for system components including, but not limited to, the system memory 1004 to the processor 1012. The system bus 1006 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile 1008 and/or volatile 1010 memory. A basic input/output system (BIOS) can be stored in the non-volatile 1008.

The computer 1002 may include various types of computer-readable storage media in the form of one or more lower speed memory units, including an internal (or external) hard disk drive 1030, a magnetic disk drive 1016 to read from or write to a removable magnetic disk 1020, and an optical disk drive 1028 to read from or write to a removable optical disk 1032 (e.g., a CD-ROM or DVD). The hard disk drive 1030, magnetic disk drive 1016 and optical disk drive 1028 can be connected to system bus 1006 the by an HDD interface 1014, and FDD interface 1018 and an optical disk drive interface 1034, respectively. The HDD interface 1014 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1008, and volatile 1010 memory, including an operating system 1022, one or more applications 1042, other program modules 1024, and program data 1026. In one embodiment, the one or more applications 1042, other program modules 1024, and program data 1026 can include, for example, the various applications and/or components of the system 100.

A user can enter commands and information into the computer 1002 through one or more wire/wireless input devices, for example, a keyboard 1050 and a pointing device, such as a mouse 1052. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1012 through an input device interface 1036 that is coupled to the system bus 1006 but can be connected by other interfaces such as a parallel port, IEEE 1394 serial port, a game port, a USB port, an IR interface, and so forth.

A monitor 1044 or other type of display device is also connected to the system bus 1006 via an interface, such as a video adapter 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory and/or storage device 1058 is illustrated. The logical connections depicted include wire/wireless connectivity to a local area network 1056 and/or larger networks, for example, a wide area network 1054. Such LAN and WAN networking environments are commonplace in offices and companies, and facilitate enterprise-wide computer networks, such as intranets, all of which may connect to a global communications network, for example, the Internet.

When used in a local area network 1056 networking environment, the computer 1002 is connected to the local area network 1056 through a wire and/or wireless communication network interface or network adapter 1038. The network adapter 1038 can facilitate wire and/or wireless communications to the local area network 1056, which may also include a wireless access point disposed thereon for communicating with the wireless functionality of the network adapter 1038.

When used in a wide area network 1054 networking environment, the computer 1002 can include a modem 1040, or is connected to a communications server on the wide area network 1054 or has other means for establishing communications over the wide area network 1054, such as by way of the Internet. The modem 1040, which can be internal or external and a wire and/or wireless device, connects to the system bus 1006 via the input device interface 1036. In a networked environment, program modules depicted relative to the computer 1002, or portions thereof, can be stored in the remote memory and/or storage device 1058. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-9 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 11:
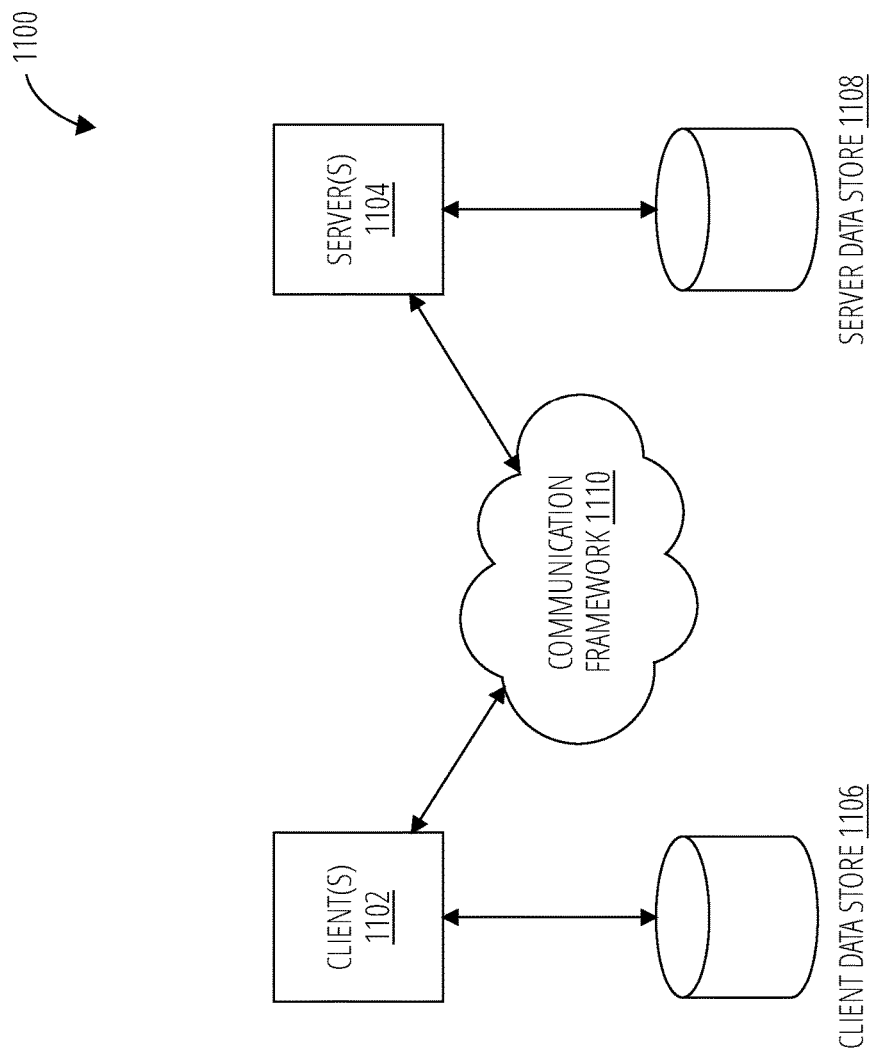
FIG. 11 illustrates a communications architecture 1100 in accordance with embodiments.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100, which may be consistent with system 100.

As shown in FIG. 11, the communications architecture 1100 includes one or more client(s) 1102 and server(s) 1104. The server(s) 1104 may implement one or more devices of system 100. The client(s) 1102 and the server(s) 1104 are operatively connected to one or more respective client data store 1106 and server data store 1108 that can be employed to store information local to the respective client(s) 1102 and server(s) 1104, such as cookies and/or associated contextual information.

The client(s) 1102 and the server(s) 1104 may communicate information between each other using a communication framework 1110. The communication framework 1110 may implement any well-known communications techniques and protocols. The communication framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1110 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.11 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1102 and the server(s) 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A system, comprising:
   a storage configured to store graph databases;
   one or more processors coupled with the storage; and
   a memory coupled with the storage and the one or more processors, the memory to store instructions, the instructions that when executed by the one or more processors, cause the one or more processors to:
   obtain a first data comprising a first set of elements in a structured format and a first connection information;
   obtain a second data comprising one or more text segments, the one or more text segments comprising potential elements;
   apply a name entity recognition analysis to the second data to detect a second set of elements and a second connection information, the second set of elements detected from the potential elements and the second connection information to indicate links between one or more of the second set of elements;
   generate a graph model comprising nodes and edges from the first set of elements, and the second set elements, wherein each node comprises an element from the first set of elements or the second set of elements, and each edge to link one of the nodes to another one of the nodes based on at least one of: the first connection information, the second connection information, and a combination thereof;
   apply a text similarity analysis to at least one of the first data, the second data, or combination thereof to determine one or more of the edges between the nodes of the graph model, the one or more edges are determined for the nodes based on a similarity score above a similarity threshold as a result of the text similarity analysis;
   store the graph model in a graph database in the storage;
   receive a search query of an element of a first type;

determine, based on the graph model, one or more elements of one or more other types connected to the element of the first type in the graph model, the one or more elements having a number of connections either directly or indirectly with the element of the first type above a first threshold value;

determine, from the one or more elements, at least two elements of a second type having a number of common elements of a third type above a second threshold value;

generate a display of the one or more elements in a hierarchal structure comprising one or more rows of the one or more elements and an indication of the at least two elements of the second type, wherein a top of the hierarchal structure is the element and each row of the one or more elements to represent a different type of element; and present the display on a display device.

2. The system of claim 1, wherein the first data and the second data comprise elements of different types, and the one or more processors to connect the elements of the different types to each other via the edges.

3. The system of claim 1, the one or more processors to apply the name entity recognition analysis to the one or more text segments to identify named entities in the one or more text segments.

4. The system of claim 1, the one or more processors to determine the second connection information based on common named entities within different text segments of the one or more text segments.

5. The system of claim 1, wherein the first data is structured data in an organized data model and the second data is unstructured data in an unorganized configuration.

6. The system of claim 1, wherein the storage is a cloud-based storage, and the one or more processors to index the graph database to generate a search cluster.

7. A computer-implemented method, comprising:
obtaining a structured data comprising a node information and a connection information, the connection information to indicate links between a first set of elements of the node information;
obtaining an unstructured data comprising one or more text segments, the one or more text segments comprising potential elements;
applying a name entity recognition analysis to the unstructured data to detect a second set of elements and an additional connection information, the second set of elements detected from the potential elements and the additional connection information to indicate links between one or more of the second set of elements;
generating a graph model comprising nodes and edges from the first set of elements, and the second set elements, wherein each node comprises an element from the first set of elements or the second set of elements, and each edge to link one of the nodes to another one of the nodes based on at least one of: the connection information, the additional connection information, and a combination thereof;
applying a text similarity analysis to at least one of the first data, the second data, or combination thereof to determine one or more of the edges between the nodes of the graph model, the one or more edges are determined for the nodes based on a similarity score above a similarity threshold as a result of the text similarity analysis;
storing the graph model in a graph database in a storage;
receiving a search query of an element of a first type;

determining, based on the graph model, one or more elements of one or more other types connected to the element of the first type in the graph model, the one or more elements having a number of connections either directly or indirectly with the element of the first type above a first threshold value;

determining, from the one or more elements, at least two elements of a second type having a number of common elements of a third type above a second threshold value;

generating a display of the one or more elements in a hierarchal structure comprising one or more rows of the one or more elements and an indication of the at least two elements of the second type, wherein a top of the hierarchal structure is the element and each row of the one or more elements to represent a different type of element; and presenting the display on a display device.

8. The computer-implemented method of claim 7, wherein the structured data and the unstructured data comprise elements of different types, and the one or more processors to connect the elements of the different types to each other via the edges.

9. The computer-implemented method of claim 7, wherein applying the name entity recognition analysis to the one or more text segments comprising identifying named entities in the one or more text segments.

10. The computer-implemented method of claim 7, comprising determining the connection information based on common named entities within different text segments of the one or more text segments.

11. The computer-implemented method of claim 7, wherein the structured data is in an organized data model and the unstructured data in an unorganized configuration.

12. The computer-implemented method of claim 7, wherein the storage is a cloud-based storage, and method comprising indexing the graph database to generate a search cluster.

13. At least one non-transitory storage media storing instructions that, when executed by at least one processor, cause the at least one processor to perform operations, comprising:
obtaining a structured data comprising a node information and a connection information, the connection information to indicate links between a first set of elements of the node information;
obtaining an unstructured data comprising one or more text segments, the one or more text segments comprising potential elements;
applying a name entity recognition analysis to the unstructured data to detect a second set of elements and an additional connection information, the second set of elements detected from the potential elements and the additional connection information to indicate links between one or more of the second set of elements;
generating a graph model comprising nodes and edges from the first set of elements, and the second set elements, wherein each node comprises an element from the first set of elements or the second set of elements, and each edge to link one of the nodes to another one of the nodes based on at least one of: the connection information, the additional connection information, and a combination thereof;
applying a text similarity analysis to at least one of the first data, the second data, or combination thereof to determine one or more of the edges between the nodes of the graph model, the one or more edges are determined for the nodes based on a similarity score above a similarity threshold as a result of the text similarity analysis;
storing the graph model in a graph database in a storage;
receiving a search query of an element of a first type;
determining, based on the graph model, one or more elements of one or more other types connected to the element of the first type in the graph model, the one or more elements having a number of connections either directly or indirectly with the element of the first type above a first threshold value;
determining, from the one or more elements, at least two elements of a second type having a number of common elements of a third type above a second threshold value;
generating a display of the one or more elements in a hierarchal structure comprising one or more rows of the one or more elements and an indication of the at least two elements of the second type, wherein a top of the hierarchal structure is the element and each row of the one or more elements to represent a different type of element; and
presenting the display on a display device.

* * * * *